United States Patent
Luckhardt et al.

(10) Patent No.: US 10,674,569 B2
(45) Date of Patent: ***Jun. 2, 2020

(54) DOMESTIC APPLIANCE, IN PARTICULAR COOKING OVEN, WITH A CAMERA

(71) Applicant: Electrolux Appliances Aktiebolag, Stockholm (SE)

(72) Inventors: Christoph Luckhardt, Rothenburg ob der Tauber (DE); Fabienne Reinhard-Herrscher, Rothenburg ob der Tauber (DE); Kersten Kaiser, Rothenburg ob der Tauber (DE)

(73) Assignee: Electrolux Appliances Aktiebolag, Stockholm (SE)

(*) Notice: Subject to any disclaimer, the term of this patent is extended or adjusted under 35 U.S.C. 154(b) by 91 days.

This patent is subject to a terminal disclaimer.

(21) Appl. No.: 15/325,852

(22) PCT Filed: May 20, 2015

(86) PCT No.: PCT/EP2015/061071
§ 371 (c)(1),
(2) Date: Jan. 12, 2017

(87) PCT Pub. No.: WO2016/034295
PCT Pub. Date: Mar. 10, 2016

(65) Prior Publication Data
US 2017/0208652 A1    Jul. 20, 2017

(30) Foreign Application Priority Data

Sep. 3, 2014 (EP) .................................. 14183303
Nov. 26, 2014 (EP) .................................. 14194985

(51) Int. Cl.
*H05B 6/64* (2006.01)
*F24C 7/08* (2006.01)
(Continued)

(52) U.S. Cl.
CPC ........... *H05B 6/6447* (2013.01); *F24C 7/085* (2013.01); *F24C 15/024* (2013.01);
(Continued)

(58) Field of Classification Search
CPC ...... H05B 6/6447; H05B 3/84; H05B 6/6473; H04N 5/2254; H04N 5/23293;
(Continued)

(56) References Cited

U.S. PATENT DOCUMENTS 2,882,377 A * 4/1959 Rinehart ................. C03C 17/36
                                                    219/543
3,388,244 A * 6/1968 Castoe .................... E05B 17/10
                                                    362/100
(Continued)

FOREIGN PATENT DOCUMENTS

DE    10 2008 043722 A1    5/2010
DE       102012002308 A1 *  8/2013 ......... H04N 5/23203
(Continued)

OTHER PUBLICATIONS

International Search Report and Written Opinion from Corresponding Application No. PCT/EP2015/061071; dated Aug. 11, 2015.

*Primary Examiner* — Jimmy Chou
(74) *Attorney, Agent, or Firm* — Pearne & Gordon LLP

(57) ABSTRACT

A domestic appliance, in particular a cooking oven, with a camera. The domestic appliance includes a treatment chamber and a door for opening and closing the treatment chamber. The door includes a window or a transparent part. The door includes a door handle arranged at an outer side of said door. The camera is arranged inside the door handle, wherein the lens coverage of the camera extends from said camera through the window or transparent portion of the door into the interior of the treatment chamber. Picture signals generated by the camera are represented or repre-
(Continued)

Figure 1:
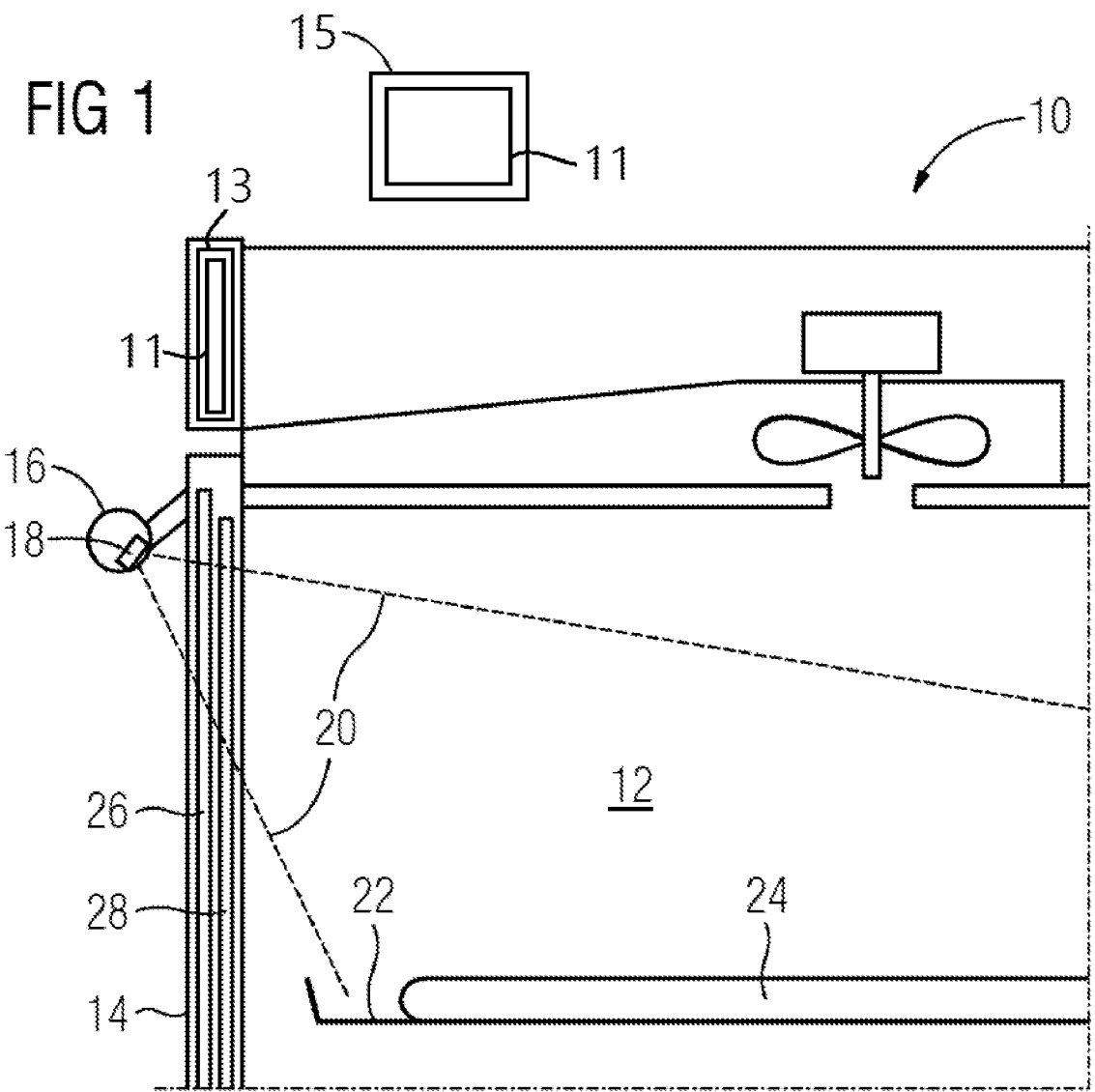

sentable by a picture displaying device, wherein said picture displaying device is a part of the control unit of the domestic appliance and/or a part of an external device connected or connectable to said domestic appliance.

20 Claims, 6 Drawing Sheets

(51) Int. Cl.
    *F24C 15/02*     (2006.01)
    *G08C 17/02*     (2006.01)
    *H04Q 9/00*     (2006.01)
    *G06T 7/55*     (2017.01)
    *G06T 7/00*     (2017.01)
    *H04N 5/225*     (2006.01)
    *H04N 5/232*     (2006.01)
    *H04N 7/18*     (2006.01)
    *H05B 3/84*     (2006.01)

(52) U.S. Cl.
    CPC .............. *G06T 7/0004* (2013.01); *G06T 7/55* (2017.01); *G08C 17/02* (2013.01); *H04N 5/2254* (2013.01); *H04N 5/2256* (2013.01); *H04N 5/23293* (2013.01); *H04N 7/183* (2013.01); *H04Q 9/00* (2013.01); *H05B 3/84* (2013.01); *H05B 6/6473* (2013.01); *G06T 2207/30128* (2013.01); *G08C 2201/93* (2013.01); *H04Q 2209/43* (2013.01); *H04Q 2209/84* (2013.01); *H05B 2203/013* (2013.01)

(58) Field of Classification Search
    CPC .... H04N 5/2256; H04N 7/183; H04N 5/2253; G06T 7/55; G06T 7/0004; F24C 7/085; F24C 15/04
    USPC ............... 219/702, 622, 393, 411, 506, 341; 99/333; 348/148, 61, 82, 83, 143, 151
    See application file for complete search history.

(56) References Cited

U.S. PATENT DOCUMENTS

| | | | | |
|---|---|---|---|---|
| 3,828,763 | A * | 8/1974 | Wilson | F24C 15/04 126/200 |
| 3,892,223 | A * | 7/1975 | McKelvey | F24C 15/04 126/200 |
| 5,032,856 | A * | 7/1991 | McMinn | G03B 29/00 348/360 |
| 5,360,965 | A * | 11/1994 | Ishii | H05B 6/64 219/685 |
| 5,361,681 | A * | 11/1994 | Hedstrom | F24C 7/087 219/413 |
| 5,373,145 | A * | 12/1994 | Endo | H05B 6/6411 219/417 |
| 5,616,270 | A * | 4/1997 | Park | H05B 6/6417 219/720 |
| 5,808,278 | A * | 9/1998 | Moon | A47G 33/00 200/43.01 |
| 5,824,999 | A * | 10/1998 | Kim | H05B 6/763 219/742 |
| 6,359,270 | B1 | 3/2002 | Bridson | G06Q 10/107 219/679 |
| 6,559,882 | B1 * | 5/2003 | Kerchner | H05B 6/6435 219/506 |
| 6,736,534 | B1 * | 5/2004 | Fite | E06B 7/30 362/576 |
| 6,822,208 | B2 * | 11/2004 | Henze | F24C 15/04 126/198 |
| 7,252,402 | B2 * | 8/2007 | Gotz | F24C 15/008 362/89 |
| 7,349,104 | B2 * | 3/2008 | Geng | A61B 5/1077 356/603 |
| 7,696,454 | B2 * | 4/2010 | Nam | F24C 7/082 219/393 |
| 8,003,923 | B2 * | 8/2011 | Wilsdorf | A47L 15/4257 219/445.1 |
| 8,342,080 | B2 * | 1/2013 | Richardson | F24C 7/08 126/332 |
| 8,563,059 | B2 * | 10/2013 | Luckhardt | F24C 7/08 426/233 |
| 8,803,851 | B2 * | 8/2014 | Lin | G06F 3/03545 345/179 |
| 9,297,538 | B2 * | 3/2016 | Hargrave | F24C 15/008 |
| 9,420,641 | B2 * | 8/2016 | Corona | H05B 6/686 |
| 2002/0070858 | A1 * | 6/2002 | Gutta | G06K 9/00255 340/541 |
| 2004/0145457 | A1 * | 7/2004 | Schofield | B60C 23/00 340/425.5 |
| 2006/0081135 | A1 * | 4/2006 | Britton | A21B 7/00 99/486 |
| 2006/0289508 | A1 * | 12/2006 | Kim | H05B 6/6441 219/714 |
| 2007/0007279 | A1 * | 1/2007 | Chun | H05B 6/6441 219/506 |
| 2007/0246453 | A1 * | 10/2007 | Nam | F24C 3/126 219/413 |
| 2009/0208058 | A1 * | 8/2009 | Schofield | G06K 9/00818 382/103 |
| 2010/0182136 | A1 * | 7/2010 | Pryor | G01F 23/292 340/425.5 |
| 2010/0195226 | A1 * | 8/2010 | Heslin | B60R 1/04 359/844 |
| 2011/0260831 | A1 * | 10/2011 | Ieda | B60R 25/246 340/5.64 |
| 2011/0303652 | A1 * | 12/2011 | Sano | F24C 7/082 219/622 |
| 2012/0048122 | A1 * | 3/2012 | Dadlani Mahtani | G05B 19/042 99/357 |
| 2012/0176409 | A1 * | 7/2012 | Noge | A63F 13/213 345/633 |
| 2013/0092032 | A1 * | 4/2013 | Cafferty | F24C 7/08 99/325 |
| 2013/0186887 | A1 * | 7/2013 | Hallgren | H05B 6/686 219/702 |
| 2013/0306627 | A1 * | 11/2013 | Libman | H05B 6/6435 219/705 |
| 2014/0041530 | A1 * | 2/2014 | Luckhardt | F24C 7/08 99/333 |
| 2014/0064545 | A1 * | 3/2014 | Cohen | B23K 13/01 381/361 |
| 2014/0203012 | A1 * | 7/2014 | Corona | H05B 6/686 219/705 |
| 2014/0245905 | A1 * | 9/2014 | Lamasanu | A47J 36/34 99/357 |
| 2014/0300738 | A1 * | 10/2014 | Mueller | B60R 11/04 348/148 |
| 2015/0161871 | A1 * | 6/2015 | Kim | A61B 5/1171 340/539.12 |
| 2015/0274091 | A1 * | 10/2015 | Lang | B60R 11/04 348/148 |
| 2015/0285512 | A1 * | 10/2015 | Matarazzi | F24C 15/00 99/341 |
| 2015/0285513 | A1 * | 10/2015 | Matarazzi | F24C 7/08 99/342 |
| 2015/0330640 | A1 * | 11/2015 | Stork genannt Wersborg | F24C 7/08 99/332 |
| 2015/0334354 | A1 * | 11/2015 | Uken | B60R 1/04 348/148 |
| 2016/0082896 | A1 * | 3/2016 | Mouser | B60R 11/04 348/148 |
| 2016/0119514 | A1 * | 4/2016 | Sugimura | G03B 17/55 348/148 |
| 2016/0366314 | A1 * | 12/2016 | Pfaffinger, Jr. | H04N 5/2253 |

(56) References Cited

U.S. PATENT DOCUMENTS

| | | | | |
|---|---|---|---|---|
| 2017/0000292 A1* | 1/2017 | Park | ................... | H04N 5/2257 |
| 2017/0261213 A1* | 9/2017 | Park | ....................... | F24C 7/085 |
| 2018/0216830 A1* | 8/2018 | Ivanovic | ................ | F24C 7/085 |

FOREIGN PATENT DOCUMENTS

| | | | | |
|---|---|---|---|---|
| DE | 102008041519 | * | 3/2020 | |
| EP | 2520169 | * | 4/2011 | ........... A47L 5/0018 |
| EP | 2 515 044 A1 | | 10/2012 | |
| EP | 2 520 169 A1 | | 11/2012 | |
| KR | 20150066244 A | * | 6/2015 | ............ B25J 9/1697 |

\* cited by examiner

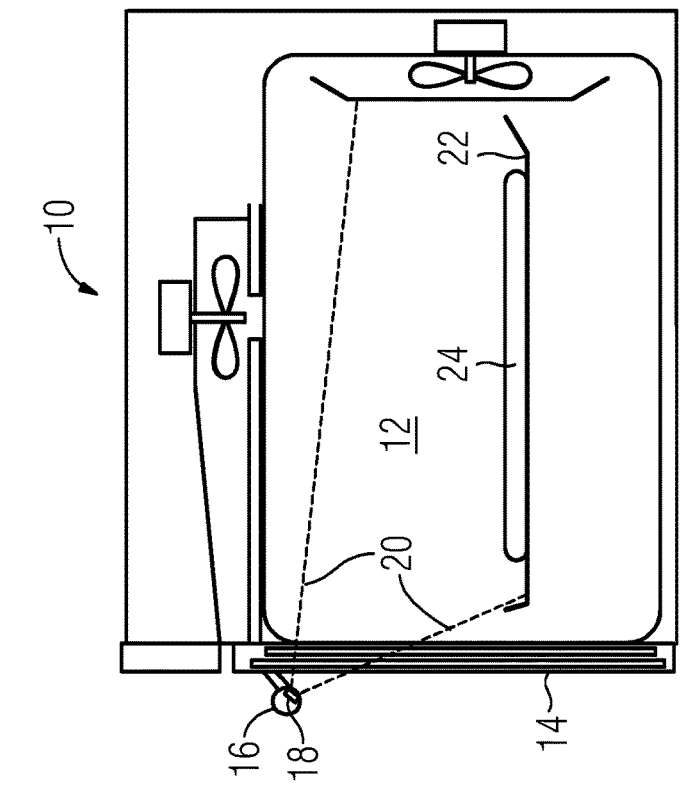
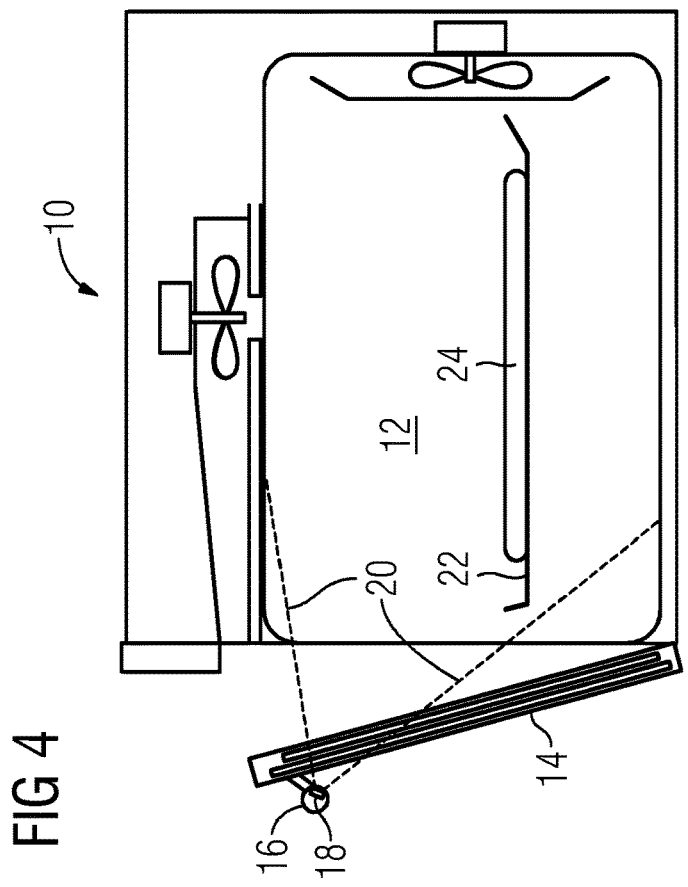
FIG 4

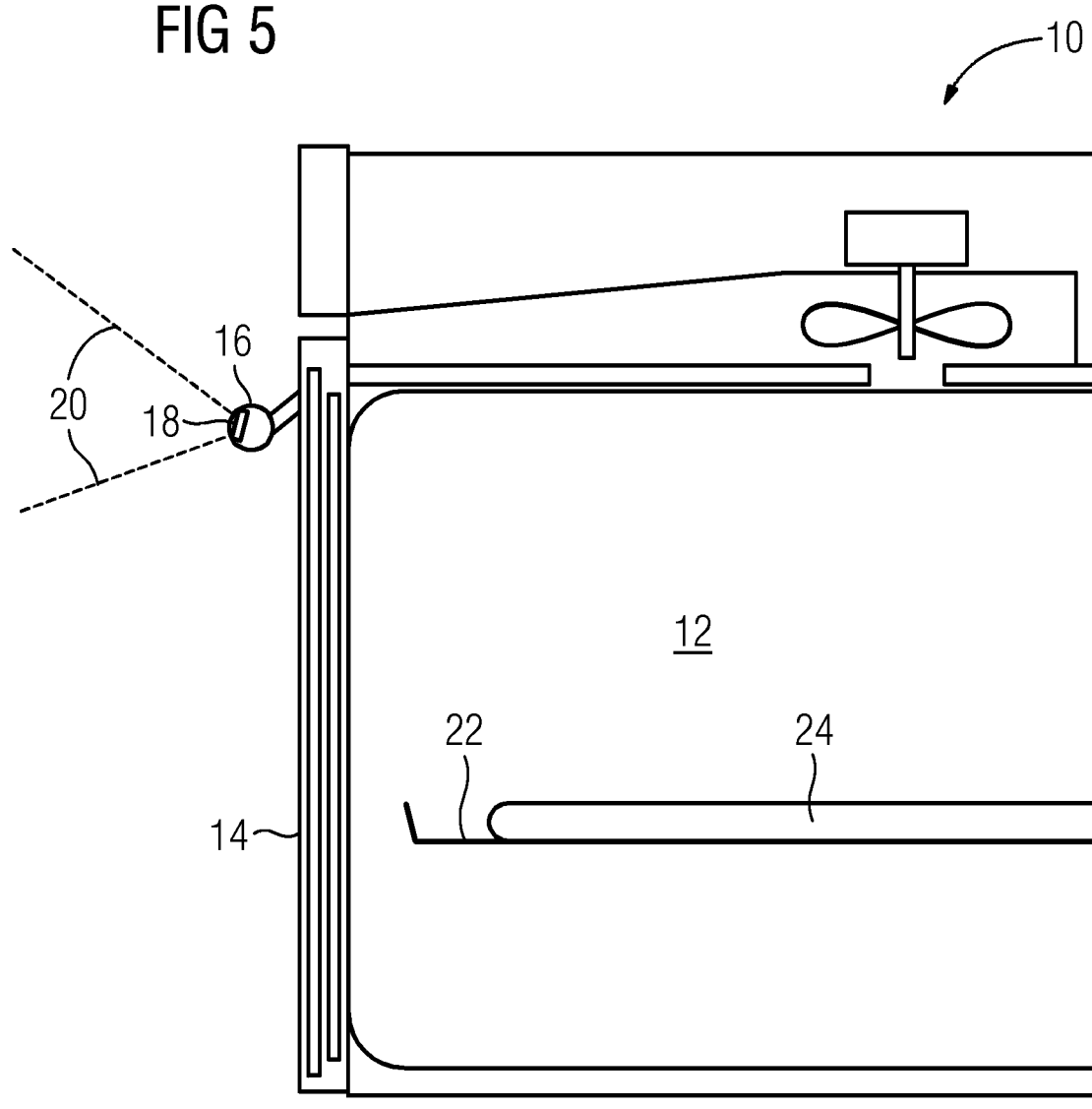

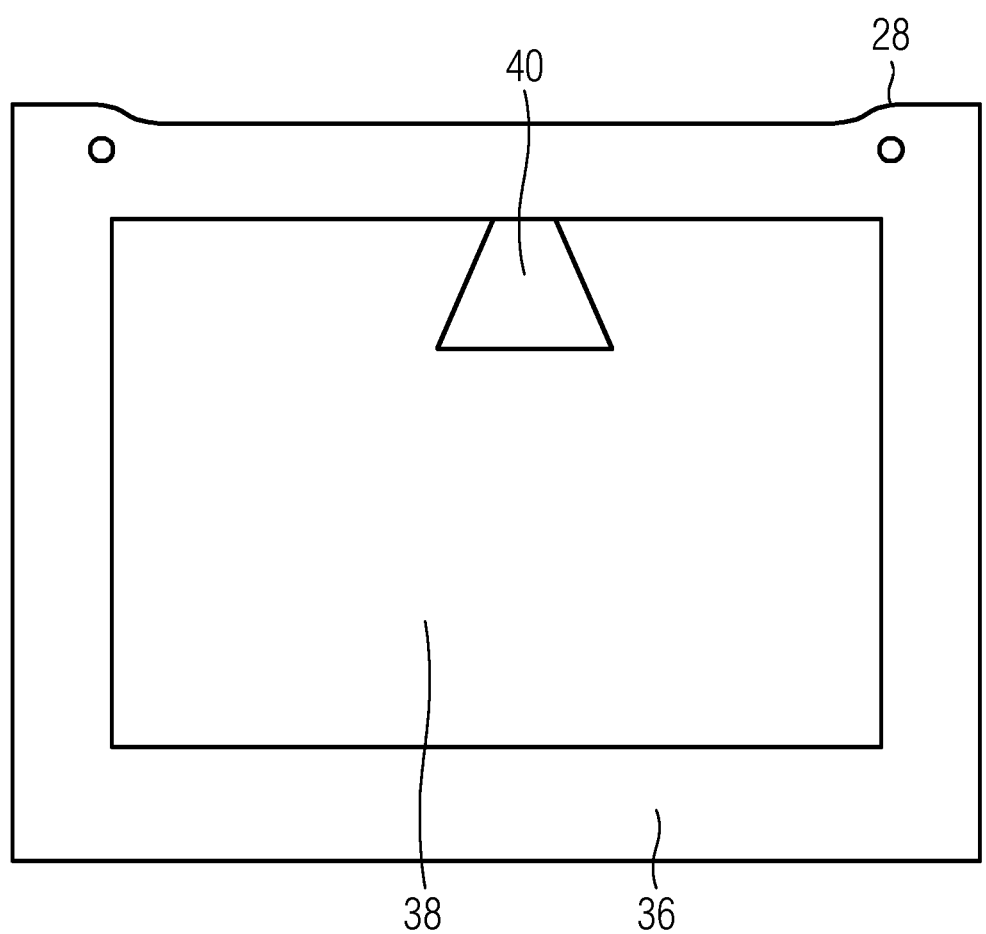

DOMESTIC APPLIANCE, IN PARTICULAR COOKING OVEN, WITH A CAMERA

The present invention relates to a domestic appliance, in particular cooking oven, with a camera.

In a number of modern domestic appliances a camera is often used for monitoring the interior of a treatment chamber. The camera relieves the treatment process, since a direct look by the user into the treatment chamber is not necessary.

If the camera is arranged inside a heated treatment chamber, then the camera requires a special housing and/or a thermal insulation and/or a cooling in order to prevent a destruction of the camera by the heat. Further, it is not easy to transmit the picture signals out of the treatment chamber.

If the camera is arranged outside the treatment chamber, then the camera requires a special holding device in order to guarantee a stable foothold of the camera. Usually, the holding device protrudes the domestic appliance.

It is an object of the present invention to provide an improved domestic appliance with a camera, which overcomes the disadvantages mentioned above, wherein the camera is installed by low complexity.

The object is achieved by the domestic appliance according to claim 1.

The present invention relates to a domestic appliance, in particular a cooking oven, with a camera, wherein
the domestic appliance comprises a treatment chamber,
the domestic appliance comprises a door for opening and closing the treatment chamber,
the door includes a window or a transparent part,
the door includes a door handle arranged at an outer side of said door,
the camera is arranged inside the door handle,
the lens coverage of the camera (18) extends from said camera through the window or transparent portion of the door into the interior of the treatment chamber,
picture signals generated by the camera are represented or representable by a picture displaying device, and
said picture displaying device is a part of the control unit of the domestic appliance and/or a part of an external device connected or connectable to said domestic appliance.

The core of the present invention is the arrangement of the camera inside the door handle. The camera does not require any additional thermal insulation or cooling. The door handle is a strong component of the domestic appliance, so that a stable foothold of the camera is guaranteed. Since the door handle is already present at the domestic appliance, the arrangement of the camera is realized by low complexity.

Preferably, the door includes at least one glass panel. The glass panel provides transparency and thermal insulation.

For example, the picture displaying device is a part of the control unit of the domestic appliance, wherein the camera is connected or connectable to said picture displaying device by wire or via a wireless data connection.

Alternatively, the picture displaying device is a part of the external device, wherein the camera is connected or connectable to said picture displaying device via the wireless data connection.

In particular, a transmitter is arranged inside the door handle or in the environment of said door handle, wherein the transmitter is provided for sending the picture signals generated by the camera to the picture displaying device.

According to a further application, the camera is provided for detecting reflections on an outer side of the door in order to recognize movements in front of the domestic appliance.

For example, the recognition of movements in front of the domestic appliance is used or usable for an automatic activation of at least one predetermined function of the domestic appliance.

Further, the domestic appliance comprises at least one illumination device arranged at an outer side of the door and directed into the interior of the treatment chamber. The illumination device provided a sufficient illumination of the treatment chamber.

Preferably, the illumination device is arranged at and/or inside the door handle. For example, the illumination device comprises a plurality of light emitting diodes.

Moreover, the control unit of the domestic appliance or the external device, respectively, includes or is supported or supportable by application software provided for representing and/or processing the picture signals generated by the camera. The application software allows a plurality of prospects on the basis of the picture signals.

According to a preferred embodiment of the present invention, the domestic appliance is a cooking oven, wherein the treatment chamber is a cooking chamber, the door is an oven door and the door handle is an oven door handle, and wherein food stuff disposed on a cooking tray inside the cooking chamber is located within the lens coverage of the camera.

Furthermore, the oven door includes thermal insulation material distributed within outer portions of said oven door, so that the window or transparent part remains in the central portion of the oven door.

Alternatively, the oven door includes shielding metal mesh, preferably at its inner side, wherein the geometric structure of said shielding metal mesh is dimensioned for microwaves. Thus, the cooking oven may comprise a microwave heating function.

In this case, the camera may comprise a pinhole lens arranged between said camera and the shielding metal mesh, wherein the optical diameter of said pinhole lens is smaller than or equal as the holes of the shielding metal mesh.

Further, the oven door may include thermal insulation material distributed within said oven door, so that the part in front of the pinhole lens remains transparent. This is a combination of the embodiments with the shielding metal mesh and the thermal insulation material.

Moreover, the camera may be provided for recording two or more images of the interior of the cooking chamber during opening and/or closing the oven door, so that three-dimensional features of the food stuff inside the cooking chamber are calculated by triangulation of multiple points of said images. On the basis of the positions of the camera and the images recorded from said positions the three-dimensional features of the food stuff are calculated by triangulation of multiple points of the images. Said three-dimensional features may be used as parameter for recognizing said food stuff. Further, the three-dimensional features of the food stuff may be used for the calculation of the temperature distribution inside the food stuff.

Additionally, the oven door handle or at least that part of the oven door handle including the camera may be pivotable, so that the lens coverage of the camera is adjustable, wherein preferably the lens coverage of the camera is directed to the food stuff inside the cooking chamber on the one hand and to a portion in front of the cooking oven on the other hand. For example, the camera directed to the front portion of the cooking oven may be used as a home surveillance device.

At last, a metal coating may be applied at an inner side of the oven door, wherein said metal coating extends at least over the lens coverage of the camera penetrating the oven door, and wherein preferably the metal coating is applied at an inner side of the inner glass panel of the oven door, and/or wherein preferably the metal coating is directly heated or heatable by an electric current flowing through said metal coating, and/or wherein preferably at least an area of the metal coating penetrated by the lens coverage of the camera is optically transparent in view of at least a part of the frequency spectrum of said camera. The high thermal conductivity of the metal coating prevents condensation at the inner side of the inner glass pane, in particular during baking or steaming. The metal coating guarantees a high visibility through the oven door between the camera and the food stuff. The metal coating may have a suitable electric conductivity and resistance, so that the metal coating may act as an electric heating element. Further, the optical transparency of the metal coating may be at least partially adapted to the frequency spectrum of the camera, at least in that area of the metal coating, in which said metal coating is penetrated by the lens coverage of the camera.

Novel and inventive features of the present invention are set forth in the appended claims.

Figure 2:
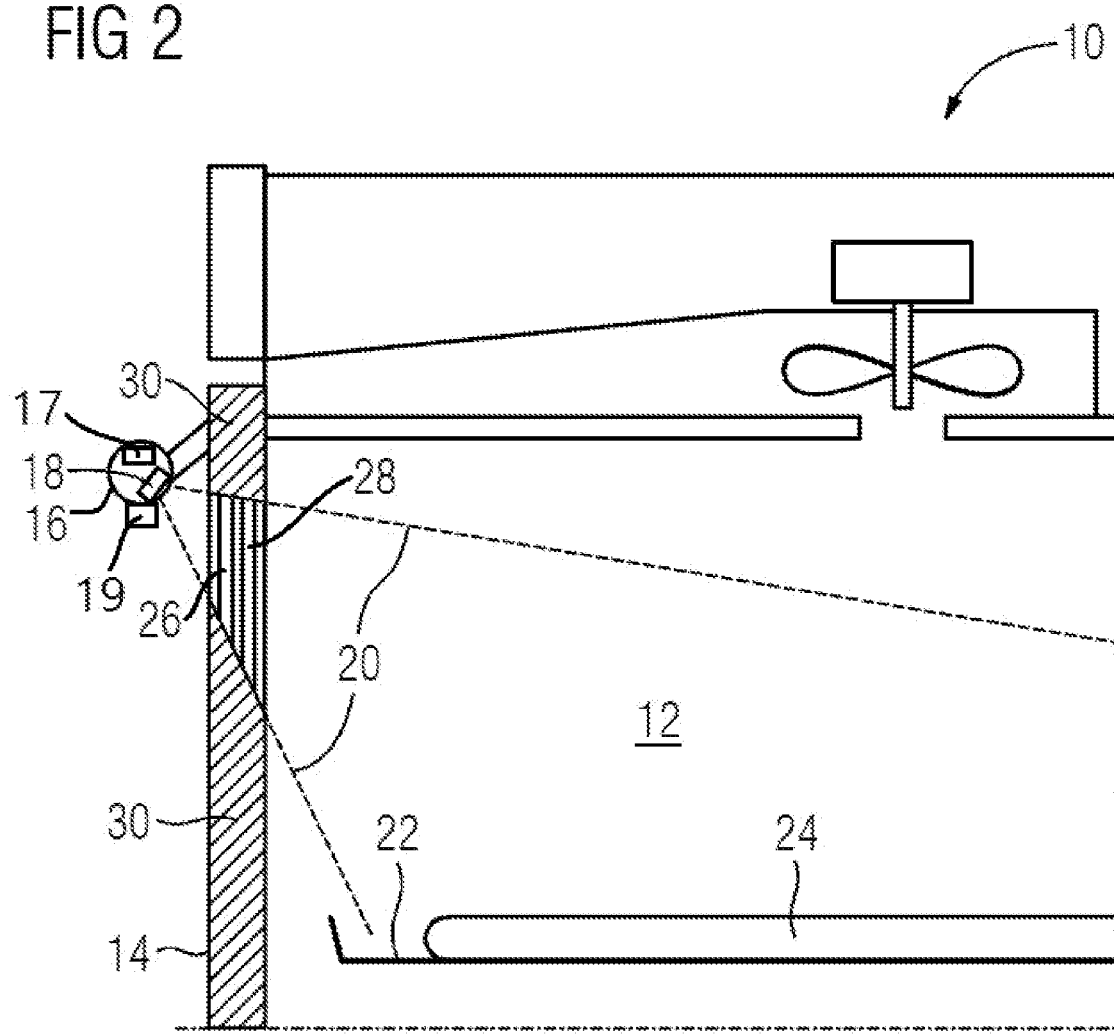
Figure 3:
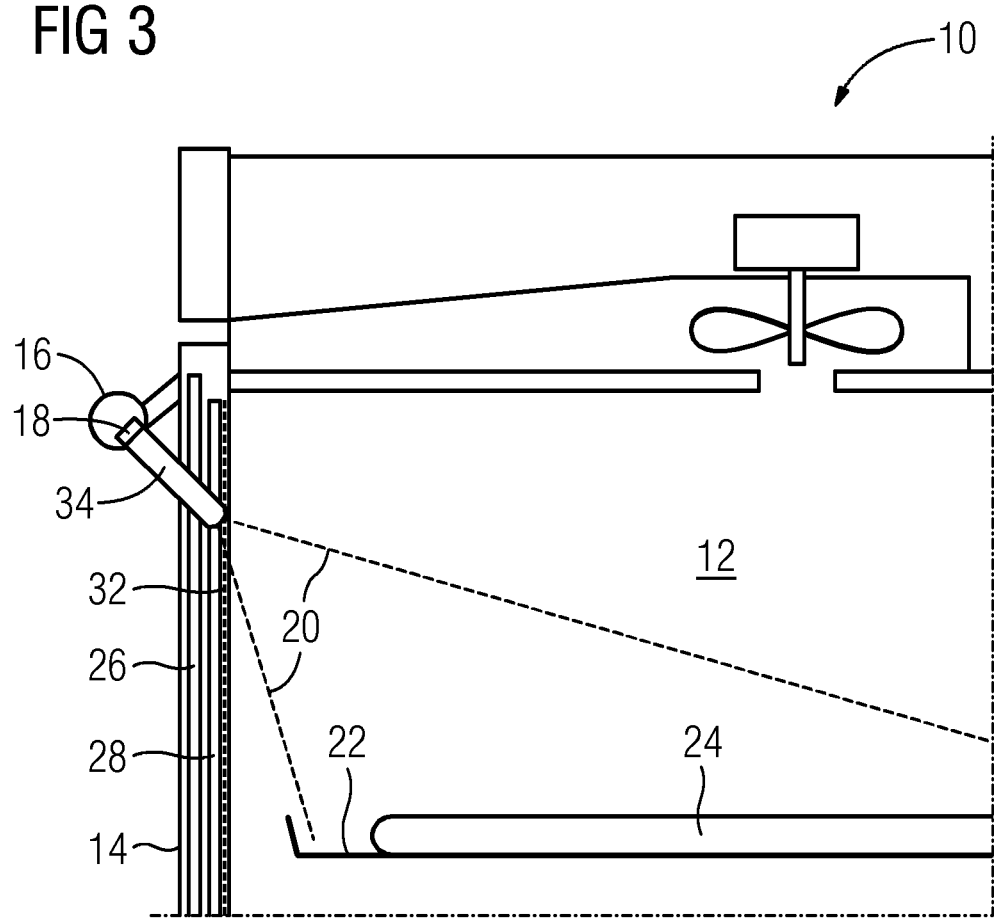

The present invention will be described in further detail with reference to the drawing, in which FIG. 1 illustrates a schematic partial sectional side view of a cooking oven with a camera according to a first embodiment of the present invention, FIG. 2 illustrates a schematic partial sectional side view of the cooking oven with the camera according to a second embodiment of the present invention, FIG. 3 illustrates a schematic partial sectional side view of the cooking oven with the camera according to a third embodiment of the present invention, FIG. 4 illustrates two schematic sectional side views of the cooking oven with the camera according to a fourth embodiment of the present invention, wherein an oven door is in a partially opened state and in a closed state, respectively, FIG. 5 illustrates a schematic partial sectional side view of the cooking oven with the camera according to a fifth embodiment of the present invention, and FIG. 6 illustrates a schematic front view of an inner glass panel for the oven door with the camera according to a preferred embodiment of the present invention.

FIG. 1 illustrates a schematic partial sectional side view of a cooking oven 10 with a camera 18 according to a first embodiment of the present invention.

The cooking oven 10 includes a cooking chamber 12 openable and closable by an oven door 14. In this example, the oven door 14 forms the front side of the cooking chamber 12. The oven door 14 comprises an oven door handle 16 arranged at an upper portion of an outer side of said oven door 14. The oven door 14 includes a window, so that at least a part of said oven door 14 is transparent. In this example, the oven door 14 includes an outer glass panel 26 and an inner glass panel 28.

The camera 18 is located inside the oven door handle 16. A lens coverage 20 of the camera 18 is directed from said camera 18 through the oven door 14 to food stuff 24 disposed on a cooking tray 22 inside the cooking chamber 12. The camera 18 is connected or connectable by wire or wireless to a picture displaying device 11. Said picture displaying device 11 may be a part of a user interface or control unit 13 of the cooking oven 10 or an external device 15. For example, said external device 15 is a television, a smartphone, a netbook, a notebook or a personal computer.

The picture of the cooking chamber 12 detected by the camera 18 may be used by the user, by the control unit or by the external device for a plurality of functions.

One group of functions relates to the safety of the cooking oven 10. For example, the picture detected by the camera 18 indicates if the cooking chamber 12 is empty in order to perform a treatment by pyrolysis. Further, the picture detected by the camera 18 may indicate if a fan cover is inside the cooking chamber 12. Moreover, the picture detected by the camera 18 may indicate if the fan is turning. Additionally, the picture detected by the camera 18 may indicate if smoke is gathering inside the cooking chamber 12.

Another group of functions supports the cooking process. For example, the information from the picture detected by the camera 18 recognizes the level of the cooking tray 22. Further, the information from the picture detected by the camera 18 recognizes browning of the food stuff 24. Moreover, the information from the picture detected by the camera 18 recognizes the number of the cooking trays 22 inside the cooking chamber 12. The control unit may give advices in view of the heating mode and/or temperature ion the basis of the information mentioned above.

A further group of functions relates to services for the cooking oven 10. For example, the information from the picture detected by the camera 18 recognizes if the illumination of the cooking chamber 12 is defect.

FIG. 2 illustrates a schematic partial sectional side view of the cooking oven 10 with the camera 18 according to a second embodiment of the present invention.

The cooking oven 10 includes the cooking chamber 12 openable and closable by the oven door 14 at the front side of said cooking chamber 12. The oven door 14 comprises the oven door handle 16 arranged at the upper portion of the outer side of said oven door 14. The oven door 14 includes the outer glass panel 26 and the inner glass panel 28. Further, the oven door 14 of the second embodiment includes a thermal insulation material 30 enclosing outer portions of the outer glass panel 26 and the inner glass panel 28, so that a window remains in the central portion of the oven door 14. Thus, in said central portion the oven door 14 is transparent. The thermal insulation material 30 allows improved energy efficiency. The window in the oven door 14 is defined by the thermal insulation material 30.

The camera 18 is located inside the oven door handle 16. The lens coverage 20 of the camera 18 is directed through the window of the oven door 14 to the food stuff 24 disposed on the cooking tray 22 inside the cooking chamber 12. The camera 18 is connected or connectable by wire or wireless to the picture displaying device, wherein said picture displaying device may be the user interface of the cooking oven 10 or the external device.

FIG. 3 illustrates a schematic partial sectional side view of the cooking oven 10 with the camera 18 according to a third embodiment of the present invention.

The cooking oven 10 includes the cooking chamber 12 openable and closable by the oven door 14 at its front side. The oven door 14 comprises the oven door handle 16 arranged at the upper portion of the outer side of said oven door 14. The oven door 14 includes the outer glass panel 26 and the inner glass panel 28. Further, the oven door 14 of the third embodiment includes a shielding metal mesh 32 at an inner side of the inner glass panel 28. The geometric structure of the shielding metal mesh 32 is dimensioned for microwaves. Thus, the cooking oven 10 of the third embodiment is suitable for microwave heating means. The shielding metal mesh 32 includes a plurality of small holes, so that the oven door 14 remains partially transparent.

The camera 18 is located inside the oven door handle 16. A pinhole lens 34 is arranged between the camera 18 and the shielding metal mesh 32. The diameter of said pinhole lens 34 is smaller than or equal as the holes of the shielding metal mesh 32. The pinhole lens 34 allows the camera 18 seeing through the shielding metal mesh 32.

The lens coverage 20 of the camera 18 is directed through the shielding metal mesh 32 to the food stuff 24 disposed on the cooking tray 22 inside the cooking chamber 12. The camera 18 is connected or connectable by wire or wireless to the picture displaying device, wherein said picture displaying device may be the user interface of the cooking oven 10 or the external device.

Furthermore, the cooking ovens 10 according to the second and third embodiments of the present invention may be combined, so that the oven door 14 includes the thermal insulation material 30 as well as the shielding metal mesh 32. In this case, the window defined by the thermal insulation material 30 is minimized, but sufficient, while the portion covered by the thermal insulation material 30 is maximized, so that the energy efficiency is optimized.

FIG. 4 illustrates two schematic sectional side views of the cooking oven 10 with the camera 18 according to a fourth embodiment of the present invention, wherein the oven door 14 is in a partially opened state and in a closed state, respectively.

In this embodiment, during closing and/or opening the oven door 14 multiple images of the cooking chamber 12 and the food stuff 24 are recorded by the camera 18. Since the position of the camera 18 at the oven door handle 16 and the movement path of the oven door 14 are known, the position of the camera 18 in relation to the cooking chamber 12 can be calculated. For example, a door switch may be used for identifying certain opening angles and/or the closed state of the oven door 14. Further, known points and/or structures on the recorded image may be used for calculating the position of the camera 18. For example, the position of a fan cover at the rear side of the cooking chamber 12 may be used.

On the basis of the positions of the camera 18 and the images recorded from said positions three-dimensional features of the food stuff 24 inside the cooking chamber 12 are calculated by triangulation of multiple points of the images. In particular, the three-dimensional features of the food stuff 24 are used as parameter for recognizing said food stuff 24. Such a method is described in detail by WO 2013/167333 A1. Further, the three-dimensional features of the food stuff 24 may be used for the calculation of the temperature distribution inside the food stuff 24. Such a method is described elaborately in EP 1 921 384 A1.

Since the multiple images are recorded during closing and/or opening the oven door 14, the food stuff 24 is already placed in the cooking chamber 12. In this situation, a temperature sensor may be already inserted in the food stuff 24, wherein the three-dimensional position of said temperature sensor is recognized. A warning signal may be generated, if the temperature sensor would be inserted in a wrong way.

Although the oven door 14 of the fourth embodiment is similar as the oven door 14 of the first embodiment, the triangulation of the fourth embodiment may be also applied to the oven doors 14 according to the second and third embodiments.

FIG. 5 illustrates a schematic partial sectional side view of the cooking oven 10 with the camera 18 according to a fifth embodiment of the present invention.

The oven door handle 16 or at least that part of the oven door handle 16 including the camera 18 is pivotable, so that the lens coverage 20 of the camera 18 is adjustable. On the one hand, the lens coverage 20 of the camera 18 may be directed from said camera 18 to the food stuff 24 disposed on the cooking tray 22 inside the cooking chamber 12. On the other hand, the lens coverage 20 of the camera 18 may be directed from said camera 18 to the portion in front of the cooking oven 10. For example, the camera 18 is connected by sliding contacts or wireless to the picture displaying device and/or to a power supply.

The lens coverage 20 of the camera 18 directed to the front portion of the cooking oven 10 may be utilised, when the camera 18 is not used for controlling the cooking process. For example, the camera 18 directed to the front portion of the cooking oven 10 may be used as a home surveillance device.

The oven door handle 16 with the camera 18 according to the fifth embodiment can be combined with each of the oven doors 14 according to the embodiments mentioned above.

FIG. 6 illustrates a schematic front view of the inner glass panel 28 for the oven door 14 with the camera 18 according to a preferred embodiment of the present invention. The inner glass panel 28 is suitable for each of the oven doors 14 according to the embodiments mentioned above.

The inner glass panel 28 includes an outer portion 36 and an inner portion 38. The inner portion 38 is transparent, while the outer portion 36 is semi-transparent or non-transparent. Alternatively, the inner portion 38 as well as the outer portion 36 may be transparent.

The inner glass panel 28 includes a metal coating 40. In this example, the metal coating 40 extends over a trapezoid area in an upper centre within the inner portion 38 of the inner glass panel 28. The metal coating 40 is arranged in that section of the inner glass panel 28, which is penetrated by the lens coverage 20 of the camera 18. Alternatively, the metal coating 40 may extend over the whole area of the inner glass panel 28. Further, the metal coating 40 may also extend over the inner portion 38 of the inner glass panel 28. In general, the metal coating 40 extends over an area, which is equal or bigger than the section of the inner glass panel 28 penetrated by the lens coverage 20 of the camera 18.

Moreover, the metal coating may be used as an electric heating element. In this case, the metal coating has a suitable electric conductivity and resistance, so that the metal coating is heated up by an electric current flowing through said metal coating.

Furthermore, the optical transparency of the metal coating may be adapted to at least a part of the frequency spectrum of the camera, at least in that area of the metal coating, in which said metal coating is penetrated by the lens coverage of the camera.

The metal coating 40 is applied on the inner side of the inner glass panel 28. The high thermal conductivity of the metal coating 40 prevents condensation at the inner side of the inner glass panel 28, in particular during baking or steaming. This guarantees a high visibility through the oven door 14 between the camera 18 and the food stuff 24.

The energy supply for the camera 18 may be realized by a direct cable connection, by sliding contact elements, by a plug connector, by a wireless inductive power transmission, be a battery or by a rechargeable power pack.

Optionally, the cooking oven 10 includes an illumination device 19 located at or inside the oven door handle 16.

Preferably, said illumination device 19 is realized by light emitting diodes (LED). The illumination device 19 is provided for illuminating the food stuff 24 disposed on the cooking tray 22.

Since the camera 18 is arranged outside the cooking chamber 12, the temperature in the environment of said camera 18 is relative low. Thus, any thermal isolation or cooling is not required for the camera 18. An additional or special housing for the camera 18 is not necessary.

Further, the cooking oven 10 may be connected or connectable to a mobile or stationary computer device via a wireless data connection. For example, the mobile computer device may be a mobile phone, a smart phone, a tablet personal computer, a netbook or a notebook. A transmitter 17 and/or receiver for the wireless data connection may be arranged inside the oven door handle 16 or in the environment of said oven door handle 16.

According to one example the wireless data connection may be unidirectional, wherein picture signals may be transferred from the camera 18 to the mobile or stationary computer device. In this case, the user is able to monitor a working process of the cooking oven 10 by the mobile or stationary computer device.

According to another example the wireless data connection is bidirectional, wherein picture signals may be transferred from the camera 18 to the mobile or stationary computer device as well as from the mobile or stationary computer device to the control unit of the cooking oven 10. In the latter case, the user is able to control the cooking process of the cooking oven 10 by the mobile or stationary computer device.

If the wireless data connection between the camera 18 and the mobile or stationary computer device is unidirectional, then the user may control the cooking oven 10 manually by the control unit. If the wireless data connection between the cooking oven 10 and the mobile or stationary computer device is bidirectional, then the user may control the cooking oven 10 by the mobile or stationary computer device and/or the control unit of said cooking oven 10.

The cooking oven 10 with the camera 18 on the one hand and the mobile or stationary computer device on the other hand may be interconnected or interconnectable via the internet. For example, the cooking oven 10 is connected or connectable to the internet via a local area network (LAN) or a wireless local area network (WLAN) to the internet. The mobile computer device may be connected or connectable to the internet via the wireless local area network (WLAN) or a mobile communications network, while the stationary computer device may be connected or connectable to the internet via the local area network (LAN).

Alternatively, the wireless data connection between the cooking oven 10 and the mobile or stationary computer device may be realized via a radio contact. Further, the cooking oven 10 and the mobile or stationary computer device may be interconnected or interconnectable via infrared signals. In general, an arbitrary wireless data connection between the cooking oven 10 and the mobile or stationary computer device is possible. Preferably, the selection of the type of the wireless data connection between the cooking oven 10 and the mobile or stationary computer device depends on the favoured operating distance.

A display and/or a touch screen of the mobile or stationary computer device may be provided for indicating current pictures recorded by the camera 18 of the cooking oven 10. The wireless data connection from the cooking oven 10 to the mobile or stationary computer device is provided for transferring picture signals in real time.

Optionally, there is an external connection between the mobile or stationary computer device and the internet. Said external connection allows communications between the mobile or stationary computer device and the internet. For example, the mobile or stationary computer device may use applications provided by the internet. Further, the user is able to download software for the mobile or stationary computer device from the internet. Moreover, the user can access to data bases in the internet by the mobile or stationary computer device.

In particular, application software ("APP") for the mobile or stationary computer device is provided. Said application software comprises one or more functions and/or features supporting the operations of the mobile or stationary computer device. The application software ("APP") comprises a viewing function, which allows the representation of the picture signal from the camera 18 of the cooking oven 10 on the display or touch screen of the mobile or stationary computer device. The viewing function allows a current viewing of the food stuff 24 on the cooking tray 22 inside the oven chamber 12 on the display or touch screen of the mobile or stationary computer device. A real-time transmission of pictures from the camera 18 of the cooking oven 10 to the display of the mobile or stationary computer device is possible. Thus, the user is able to monitor the food stuff 24 inside the oven chamber 12 of the cooking oven 10 from a distance by the mobile or stationary computer device. The user is always able to be informed about the current state of the food stuff 24 inside the cooking chamber 12.

According to a special embodiment of the present invention, the camera 18 records reflections from the outer side of the oven door 14, e.g. from the outer side of the outer glass panel 26. These reflections can be used to detect movements in front of the cooking oven 10. The movement of the user in front of the cooking oven 10 can be translated into Cartesian coordinates in order to control a user interface. Certain gestures of the user may be linked to corresponding actions of the user interface, e.g. activating and deactivating the light of the cooking oven 10. In order to improve the reflections of the user on the outer side of the oven door 14 the light inside the cooking chamber 12 is dimmed and/or the light in front of the cooking oven 10 is brightened up, when the presence or an interaction of the user is recognized.

Although embodiments of the cooking oven 10 are described above, the present invention in general relates to a domestic appliance with a treatment chamber.

Although illustrative embodiments of the present invention has been described herein with reference to the accompanying drawing, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 cooking oven
12 cooking chamber
14 oven door
16 oven door handle
18 camera
20 lens coverage
22 cooking tray
24 food stuff
26 outer glass panel 28 inner glass panel
30 thermal insulation material
32 shielding metal mesh
34 pinhole lens
36 outer portion
38 inner portion
40 metal coating

The invention claimed is:

1. A domestic appliance with a camera, wherein the domestic appliance comprises:
    a treatment chamber; and
    a door for opening and closing the treatment chamber, the door includes a window and a door handle arranged at an outer side of said door,
    wherein the camera is arranged inside the door handle, and a field of view of the camera extends from said camera through the window and into an interior of the treatment chamber,
    and wherein picture signals generated by the camera are displayed on a picture displaying device.

2. The domestic appliance according to claim 1, wherein the door includes at least one glass panel.

3. The domestic appliance according to claim 1, wherein the picture displaying device is a part of a control unit of the domestic appliance, wherein the camera is connected or connectable to said picture displaying device by wire or via a wireless data connection.

4. The domestic appliance according to claim 1, wherein the picture displaying device is a part of an external device, wherein the camera is connected or connectable to said picture displaying device via a wireless data connection.

5. The domestic appliance according to claim 3, wherein a transmitter is arranged inside the door handle or in the environment of said door handle, wherein the transmitter is provided for sending the picture signals generated by the camera to the picture displaying device.

6. The domestic appliance according to claim 1, wherein the camera is provided for detecting reflections on an outer side of the door in order to recognize movements in front of the domestic appliance.

7. The domestic appliance according to claim 1, wherein the domestic appliance comprises at least one illumination device arranged at an outer side of the door and directed into the interior of the treatment chamber.

8. The domestic appliance according to claim 3, wherein the control unit includes or is supported or supportable by application software provided for representing and/or processing the picture signals generated by the camera.

9. The domestic appliance according to claim 1, wherein the domestic appliance is a cooking oven, wherein the treatment chamber is a cooking chamber, the door is an oven door and the door handle is an oven door handle, and wherein food stuff disposed on a cooking tray inside the cooking chamber is located within the field of view of the camera.

10. The domestic appliance according to claim 9, wherein the oven door includes thermal insulation material distributed within outer portions of said oven door, so that the window remains in a central portion of the oven door.

11. The domestic appliance according to claim 9, wherein the oven door includes shielding metal mesh and wherein a geometric structure of said shielding metal mesh is dimensioned for microwaves.

12. The domestic appliance according to claim 11, wherein the oven door includes thermal insulation material and the camera includes a pinhole lens, and wherein the thermal insulation material is distributed within said oven door such that an area of the oven door in front of the pinhole lens remains transparent.

13. The domestic appliance according claim 9, wherein the camera is provided for recording two or more images of the interior of the cooking chamber during opening and/or closing the oven door, so that three-dimensional features of the food stuff inside the cooking chamber are calculated by triangulation of multiple points of said images.

14. The domestic appliance according to claim 9, wherein the oven door handle or at least that part of the oven door handle including the camera is pivotable, so that the field of view of the camera is adjustable between a first position and a second position, wherein in the first position, the field of view of the camera is directed to the food stuff inside the cooking chamber, and in the second position, the field of view of the camera is directed to a portion in front of the cooking oven.

15. The domestic appliance according to claim 9, wherein a metal coating is applied at an inner side of the oven door, wherein said metal coating extends at least over the field of view of the camera penetrating the oven door, and wherein the metal coating is applied at an inner side of an inner glass panel of the oven door, and/or wherein the metal coating is directly heated or heatable by an electric current flowing through said metal coating, and/or wherein at least an area of the metal coating penetrated by the field of view of the camera is optically transparent in view of at least a part of the frequency spectrum of said camera.

16. The domestic appliance according to claim 1, wherein the domestic appliance is a cooking oven.

17. The domestic appliance according to claim 6, wherein the recognition of movements in front of the domestic appliance is used for an automatic activation of at least one predetermined function of the domestic appliance.

18. The domestic appliance according to claim 7, wherein the at least one illumination device is arranged at and/or inside the door handle.

19. The domestic appliance according to claim 11, wherein the camera comprises a pinhole lens arranged between said camera and the shielding metal mesh, wherein the shielding metal mesh comprises holes, and wherein an optical diameter of said pinhole lens is smaller than or equal to the holes of the shielding metal mesh.

20. The domestic appliance according to claim 4, wherein the external device includes or is supported or supportable by application software provided for representing and/or processing the picture signals generated by the camera.

* * * * *